Nov. 7, 1939.   T. E. BROWN   2,179,143
INTERNAL COMBUSTION ENGINE
Filed Feb. 9, 1939
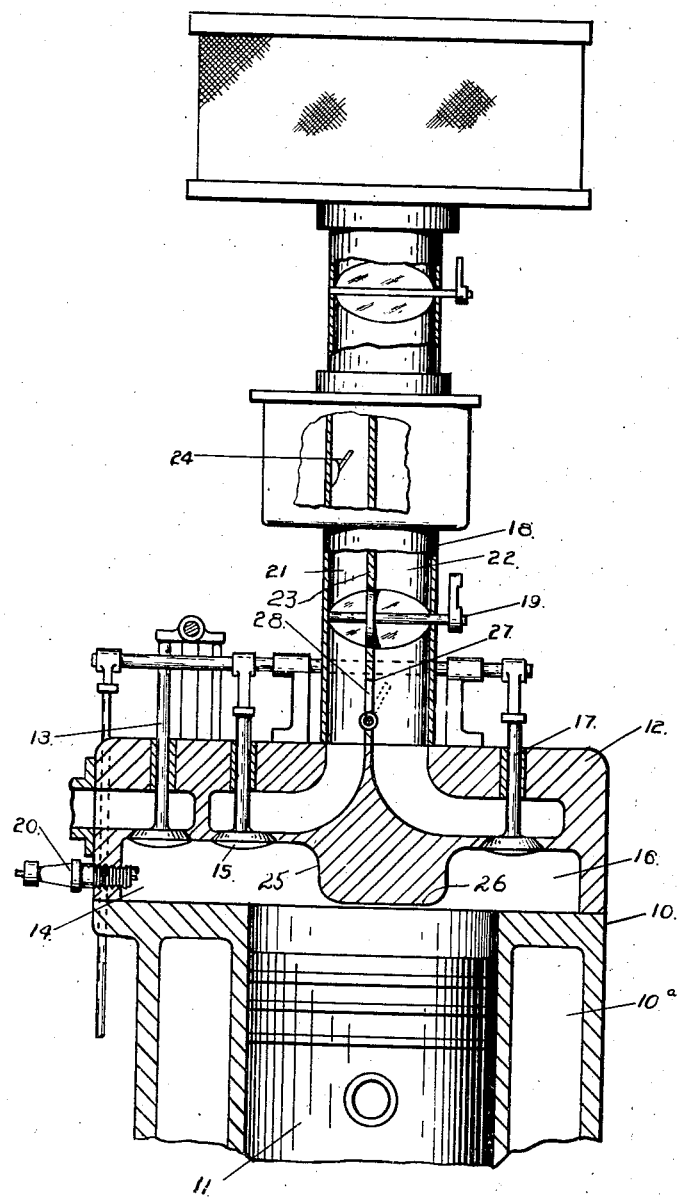
INVENTOR.
Thomas Edgar Brown
By
ATTORNEY.

Patented Nov. 7, 1939

2,179,143

UNITED STATES PATENT OFFICE 2,179,143

INTERNAL COMBUSTION ENGINE

Thomas Edgar Brown, Hamilton, Ontario, Canada

Application February 9, 1939, Serial No. 255,416

6 Claims. (Cl. 123—75)

My invention relates to a combustion chamber for internal combustion engines and the same has for one of its objects to provide a construction which will ensure the complete combustion of the combustible mixture admitted to the cylinder, thus assuring a full utilization of the energy of the mixture.

A further object of the invention is to provide a structure which will materially reduce the loss of energy by the dissipation of heat through the cooling system of the engine.

These principal objects of the invention are accomplished by constructing the engine with primary and secondary combustion chambers, an intake valve for the primary combustion chamber through which is admitted a combustible mixture in which there is present insufficient oxygen for complete combustion, an intake valve for the secondary chamber through which is admitted a volume of oxygen greater than the amount required for the complete combustion of said mixture, and providing means for maintaining a separation of the combustible mixture and the surplus oxygen during the induction and compression strokes of the engine.

Other features of my invention are set forth in the following description having regard to the accompanying drawing which shows a vertical cross-section of an internal combustion engine constructed in accordance with my invention and showing such parts as are necessary to illustrate the same.

Like characters of reference refer to like parts throughout the specification and drawing.

The internal combustion engine illustrated in the drawing comprises a cylinder 10 which is surrounded by the usual water jacket 10a, a piston 11, a head 12, an exhaust valve 13, a primary combustion chamber 14 which communicates with the cylinder 10 and has an intake valve 15, a secondary combustion chamber 16 which also communicates with the cylinder and has an intake valve 17, an intake manifold 18, a butterfly valve 19, and other members to be hereinafter described with reference to the above elements.

The combustion chamber 14 is substantially larger than the chamber 16 and is provided with a spark-plug 20. The valves are illustrated as being of the type which are mounted in the cylinder head. The exhaust and intake valves are opened and closed in the usual manner, the intake valves 15, 17 being opened simultaneously.

The intake manifold is divided into two passages 21, 22 by means of a wall 23. The passage 21 communicates with the chamber 14 through the intake valve 15, and the passage 22 through the intake valve 17. The passage 21 conducts a combustible mixture, for example, gasoline and air, to the combustion chamber 14, the gasoline being drawn into the channel through the nozzle or jet 24. The amount of air allowed to enter the passage 21 is insufficient for complete combustion. Air is admitted to the chamber 16 through the passage 22 and intake valve 17, the amount of air admitted being in excess of the amount required for the complete combustion of the combustible mixture. The flow through the passages 21, 22 is regulated by the butterfly valve 19.

The intermixing of the combustible mixture admitted to primary combustion chamber 14 and the air admitted to secondary chamber 16 is substantially prevented during the induction and compression strokes of the piston by the following means. The intake valve 15 is set in the head so that it is directly over the piston and the cylinder head is turned downwardly as indicated to form a baffle 25 which terminates slightly above the piston at the limit of its upward stroke. The inner wall 26 of the head is extended from the lower extremity of the baffle parallel to the top of the piston towards the combustion chamber 16, overlying approximately one-third of the top of the piston, and then accurately curved into the top of the combustion chamber 16. By means of this construction a mixing to any great extent on the induction stroke is prevented. Owing to the primary combustion chamber being made larger than the secondary combustion chamber, a mixing of the combustible mixture which has been drawn into the primary chamber and the cylinder with the air drawn into the secondary chamber is prevented on the compression stroke in the manner hereinafter more fully explained.

On the induction stroke, the intake valves 15, 17 open, the combustible mixture of gasoline and air being drawn into the primary combustion chamber and the cylinder; and air being drawn into the secondary chamber 16 and the cylinder. The baffle 25 which separates the two chambers directs the combustible mixture downwardly and thus prevents, to any great extent, a mixing of the combustible mixture with the surplus air as already explained.

On the compression stroke, the primary chamber being larger than the secondary chamber, it will require a greater volume of gas to fill it. This will tend to cause the combustible mixture, or substantially all the mixture, to flow into the primary chamber. It is also to be noted that at the end of the induction stroke the combustion chamber will be full of the combustible mixture undiluted by the air admitted through the valve 17. It is thus apparent that, if dilution of the combustible mixture does take place, it will not be to any great extent. On the completion of the compression stroke, the combustible mixture is fired by the spark-plug at the proper time. This causes the piston to start on its power stroke. The surplus air in the secondary chamber is then available for the complete combustion of the combustible mixture.

In the event that an insufficient volume of air is admitted into the primary chamber, I have provided an orifice 27 in the wall 23 through which an additional volume of air may be drawn, the amount of which is regulated by an adjustable valve 28.

What I claim as my invention is:

1. In an internal combustion engine, a cylinder block having a bore, a piston therein, a cylinder head having a primary combustion chamber on one side of said head and a secondary combustion chamber on the other side thereof, a wall separating said chambers, an intake valve for the primary combustion chamber through which is admitted a combustible mixture having insufficient air for complete combustion, an intake valve for the secondary combustion chamber through which is admitted a volume of air in excess of the amount required for the complete combustion of the combustible mixture, and an adjustable valve for increasing the air content of the combustible mixture.

2. An internal combustion engine having a cylinder, a piston reciprocable therein, a cylinder head in which is formed a primary combustion chamber and a secondary combustion chamber, the secondary combustion chamber being of a smaller volume than the primary combustion chamber, a dividing baffle separating the chambers and extending across the cylinder head, said baffle being substantially wide and having a flat lower face parallel to the piston top and positioned to just clear the piston top at the limit of the piston's upward stroke, an intake valve for the primary combustion chamber through which is admitted a combustible mixture of fuel vapor and air, an exhaust valve in the primary combustion chamber, a spark plug in the primary combustion chamber, and an intake valve in the secondary combustion chamber through which air only is admitted.

3. An internal combustion engine having a cylinder, a piston reciprocable therein, a cylinder head in which is formed a primary combustion chamber and a secondary combustion chamber, the secondary combustion chamber being of a smaller volume than the primary combustion chamber, a dividing baffle separating the chambers and extending across the cylinder head, the lower face of said baffle being positioned just clear of the piston top at the limit of the piston's upward stroke, said chambers extending outwardly from the baffle wall above the cylinder to points beyond the cylinder wall, an intake valve in the primary combustion chamber and positioned partly over the cylinder top and partly contained in the portion of the chamber extending beyond the cylinder wall and through which is admitted a combustible mixture of fuel vapour and air, an exhaust valve wholly contained within the portion of the primary chamber extending beyond the cylinder wall, a spark plug in the portion of the primary chamber extending beyond the cylinder wall, and an intake valve in the secondary combustion chamber partly positioned over the cylinder top and partly contained in the portion of the chamber extending beyond the cylinder wall and through which air only is admitted.

4. An internal combustion engine having a cylinder, a piston reciprocable therein, a cylinder head in which is formed a primary combustion chamber and a secondary combustion chamber, the secondary combustion chamber being of a smaller volume than the primary combustion chamber, a dividing baffle separating the chambers and extending across the cylinder head, an intake valve for the primary combustion chamber through which is admitted a combustible mixture of fuel vapor and air, an exhaust valve in the primary combustion chamber, a spark plug in the primary combustion chamber, and an intake valve in the secondary combustion chamber through which air only is admitted.

5. An internal combustion engine having a cylinder, a piston reciprocable therein, a cylinder head in which is formed a primary combustion chamber and a secondary combustion chamber, the secondary combustion chamber being of a smaller volume than the primary combustion chamber, a dividing baffle separating the chambers and extending across the cylinder head, an intake valve for the primary combustion chamber through which is admitted a combustible mixture of fuel vapor and air, an exhaust valve in the primary combustion chamber, a spark plug in the primary combustion chamber, an intake valve in the secondary combustion chamber through which air only is admitted, an intake manifold having two separate passages, one of said passages communicating with the intake valve in the primary combustion chamber, the other of said passages communicating with the intake valve in the secondary combustion chamber, and a valve mechanism contained in said passages to synchronously control a flow of air through one passage and a flow of fuel and air through the other passage.

6. An internal combustion engine having a cylinder, a piston reciprocable therein, a cylinder head in which is formed a primary combustion chamber and a secondary combustion chamber, the secondary combustion chamber being of a smaller volume than the primary combustion chamber, a dividing baffle separating the chambers and extending across he cylinder head, said baffle being substantially wide and having a flat lower face parallel to the piston top and positioned to just clear the piston top at the limit of the piston's upward stroke, an intake valve for the primary combustion chamber through which is admitted a combustible mixture of fuel vapor and air, an exhaust valve in the primary combustion chamber, a spark plug in the primary combustion chamber, an intake valve in the secondary combustion chamber through which air only is admitted, an intake manifold having two separate passages, one of said passages communicating with the intake valve in the primary combustion chamber, the other of said passages communicating with the intake valve in the secondary combustion chamber, and a valve mechanism contained in said passages to synchronously control a flow of air through one passage and a flow of fuel and air through the other passage.

THOMAS EDGAR BROWN.